(12) United States Patent　　(10) Patent No.: US 12,675,467 B2

Jose　　(45) Date of Patent: *Jul. 7, 2026

(54) PROCESSOR CONFIGURED TO PROCESS DATA IN A DATABASE BY SIMULTANEOUSLY PROCESSING ROW DATA OF KEY PAIRS WHICH INCLUDE A KEY OF A FIRST TABLE IN THE DATABASE, AND A MATCHING KEY AND A UNIQUE ROW OF A SECOND TABLE IN THE DATABASE

(71) Applicant: KeyGen Data LLC, Columbia, MD (US)

(72) Inventor: Joseph Jose, Chantilly, VA (US)

(73) Assignee: KEYGEN DATA LLC, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/815,234

(22) Filed: Aug. 26, 2024

(65) Prior Publication Data

US 2025/0165462 A1　　May 22, 2025

Related U.S. Application Data

(63) Continuation of application No. 18/117,187, filed on Mar. 3, 2023, now Pat. No. 12,072,873, which is a (Continued)

(51) Int. Cl.
*G06F 16/23* (2019.01)
*G06F 16/22* (2019.01)

(52) U.S. Cl.
CPC ...... *G06F 16/2386* (2019.01); *G06F 16/2282* (2019.01)

(58) Field of Classification Search
CPC ... G06F 16/20; G06F 16/2386; G06F 16/2282
(Continued)

(56) References Cited

U.S. PATENT DOCUMENTS 5,666,526 A * 9/1997 Reiter .................. G06F 16/235
9,286,393 B2 * 3/2016 Konik .................. G06F 16/951
(Continued)

OTHER PUBLICATIONS

Barnhill et al., "Row vs. Column Oriented Databases." Dataschool. com, downloaded from web page: <https://dataschool.com/data-modeling-101/row-vs-col. oriented-databases/>, Printout date: Jul. 27, 2021. Last modified: Jun. 22, 2021, 8 pages.

(Continued)

*Primary Examiner* — Hung T Vy

(74) *Attorney, Agent, or Firm* — Panitch Schwarze Belisario & Nadel LLP

(57) ABSTRACT

A processor is also provided for processing data in a database, wherein the database includes a first table and a second table. Each of the tables have a plurality of rows of data, wherein a key identifies one or more rows of data in the tables. There is a plurality of matching key pairs among the tables. Each key pair includes a key of a first table, and a matching key and a unique row of a second table. In operation, row data of key pairs associated with a first row of the second table are simultaneously processed, and row data of key pairs associated with any remaining rows of the second table in sequential row order are then simultaneously processed.

5 Claims, 34 Drawing Sheets

100

START

↓

102 - Read out data from only a portion of a row from tables that are to be used for the batch processing logic by specifying (i) the key of the row from the respective table, and (ii) the unique field names in the row of the respective tables to be used for the batch processing logic

↓

104 - Perform batch processing on the read out data using the batch processing logic

↓

106 - Write back the batch processed data from Step 104 into the same row of the respective table that the data was read out from in step 202, wherein the resultant row of each of the tables includes (i) batch processed data, and (ii) the remaining portion of the data in the row in each of the tables that were not read out from the row in Step 102

↓

END

Related U.S. Application Data continuation of application No. 17/391,367, filed on Aug. 2, 2021, now Pat. No. 11,599,529.

(58) Field of Classification Search
USPC ......................................................... 707/703
See application file for complete search history.

(56) References Cited

U.S. PATENT DOCUMENTS

| | | | |
|---|---|---|---|
| 2004/0187110 A1 | 9/2004 | Boyfield | |
| 2009/0292711 A1* | 11/2009 | Konik | G06F 16/24565 |
| 2012/0096054 A1* | 4/2012 | Egan | G06F 16/24561 |
| | | | 707/E17.049 |
| 2019/0324955 A1 | 10/2019 | Von Drakk | |
| 2022/0207040 A1* | 6/2022 | Li | G06F 16/24568 |

OTHER PUBLICATIONS

DBMS Keys: Candidate, Super, Primary, Foreign Key Types with Example. Copyright © Guru99 2021, downloaded from web page: <https://www.guru99.com/dbms-keys.html>, download date: Jun. 28, 2021, 11 pages.
Int'l Search Report & Written Opinion, mailed Nov. 24, 2022, in Int'l Appn PCT/US2022/039163.
Feuerstein, Steven: "Bulk data processing with Bulk Collect and Forall in PL/SQL", Nov. 4, 2020 (Nov. 4, 2020), pp. 1-13, XP055981502, Retrieved from the Internet: URL:https://blogs.oracle. com/connect/post/bulk-processing-with-bulk-collect-and-fora11 [retrieved on Nov. 15, 2022].
Feuerstein, Steven: "Oracle Live SQL—Tutorial: Bulk Processing with PL/SQL", Oct. 26, 2020 (Oct. 26, 2020), pp. 1-44, XP055982024, Retrieved from the Internet: URL: https://web.archive.org/web/ 20201026011747/https://livesql.oracle.com/apex/livesql/file/tutorial_ IEHP37S6LTWIIDQIR436SJ59L.html [retrieved on Nov. 16, 2022].
Feuerstein, Steven: "High Performance PL/SQL BulkProcessing, Function Result Cache and More", Jan. 1, 2015 (Jan. 1, 2015), pp. 1-44, XP055981507, Retrieved from the Internet: URL:https://www. neooug.org/gloc/Presentations/2019/FeuersteinHigh%20Performance% 20PLSQL.pdf [retrieved on Nov. 15, 2022].
"PL/SQL Developer 3.0 User's Guide 30 Day trial version Dec. 1999" In: PL/SQL Developer 3.0 User's Guide 30 Day trial version Dec. 1999, Dec. 22, 1999 (Dec. 22, 1999), Allround Automations, XP055128956.
Office Action issued Oct. 18, 2022 in U.S. Appl. No. 17/391,401 by Jose.
Office Action issued Oct. 6, 2022 in U.S. Appl. No. 17/391,367 by Jose.
Anonymous, "Customer Database, Cursor Processing using a COBOL with Embedded SOL Statements," pp. 1-15 (May 11, 2021) XP055981544, Retrieved from the Internet: URL https://web.archive. org/web/20210511234240/http://simotime.com/cuqcp101.htm.
Written Opinion of the International Preliminary Examining Authority issued on Jun. 27, 2023, in corresponding PCT Application No. PCT/US2022/039163.
International Preliminary Report on Patentability issued on Sep. 18, 2023, in corresponding PCT Application No. PCT/US2022/039163.

* cited by examiner

<u>100</u>

START

↓

102 - Read out data from only a portion of a row from tables that are to be used for the batch processing logic by specifying (i) the key of the row from the respective table, and (ii) the unique field names in the row of the respective tables to be used for the batch processing logic

↓

104 - Perform batch processing on the read out data using the batch processing logic

↓

106 - Write back the batch processed data from Step 104 into the same row of the respective table that the data was read out from in step 202, wherein the resultant row of each of the tables includes (i) batch processed data, and (ii) the remaining portion of the data in the row in each of the tables that were not read out from the row in Step 102

↓

END

Figure 1

TABLE A

| BALANCE AMT | ACCOUNT#(PRIMARY KEY) | NAME | ADDRESS |
|---|---|---|---|
| 1200 | 0010 | Mathew S | 47 MainST. |
| 1500 | 0011 | Sam D | 10 Wall st. |
| 200 | 0012 | Joe P | 2475 Harvest av |
| 500 | 0013 | Catherine H | 123 Whitecap tr |
| 1000 | 0014 | Dayle R | 12 williams dr |
| 1800 | 0015 | Mark M | 150 Paterson av |

TABLE B

| ACCOUNT #(FOREIGN KEY) | ROW # | DEBIT AMT | DATE | TRANID |
|---|---|---|---|---|
| 0010 | 1 | 350 | 1/1/2021 | 120 |
| 0010 | 2 | 100 | 1/7/2021 | 200 |
| 0010 | 3 | 200 | 2/20/2021 | 280 |
| 0010 | 4 | 150 | 4/8/2021 | 476 |
| 0011 | 1 | 100 | 2/15/2021 | 85 |
| 0011 | 2 | 300 | 2/17/2021 | 90 |
| 0011 | 3 | 150 | 3/5/2021 | 123 |
| 0011 | 4 | 500 | 3/6/2021 | 130 |
| 0012 | 1 | 50 | 2/12/2021 | 50 |
| 0012 | 2 | 100 | 3/12/2021 | 55 |
| 0013 | 1 | 150 | 2/20/2021 | 73 |
| 0014 | 1 | 100 | 3/20/2021 | 35 |
| 0014 | 2 | 400 | 4/3/2021 | 37 |
| 0014 | 3 | 300 | 5/12/2021 | 38 |
| 0015 | 1 | 600 | 4/15/2021 | 40 |
| 0015 | 2 | 200 | 4/16/2021 | 41 |

Figure 2A

TABLE B

| ACCOUNT #(FOREIGN KEY) | ROW # | DEBIT AMT |
|---|---|---|
| 0010 | 1 | 350 |
| 0011 | 1 | 100 |
| 0012 | 1 | 50 |
| 0013 | 1 | 150 |
| 0014 | 1 | 100 |
| 0015 | 1 | 600 |

TABLE A

| BALANCE AMT | ACCOUNT#(PRIMARY KEY) |
|---|---|
| 1200 | 0010 |
| 1500 | 0011 |
| 200 | 0012 |
| 500 | 0013 |
| 1000 | 0014 |
| 1800 | 0015 |

Figure 2B

TABLE B

| ACCOUNT #(FOREIGN KEY) | ROW # | DEBIT AMT | DATE | TRANID |
|---|---|---|---|---|
| 0010 | 1 | 0 | 1/1/2021 | 120 |
| 0011 | 1 | 0 | 2/15/2021 | 85 |
| 0012 | 1 | 0 | 2/12/2021 | 50 |
| 0013 | 1 | 0 | 2/20/2021 | 73 |
| 0014 | 1 | 0 | 3/20/2021 | 35 |
| 0015 | 1 | 0 | 4/15/2021 | 40 |

TABLE A

| BALANCE AMT | ACCOUNT#(PRIMARY KEY) | NAME | ADDRESS |
|---|---|---|---|
| 850 | 0010 | Mathew S | 47 MainST. |
| 1400 | 0011 | Sam D | 10 Wall st. |
| 150 | 0012 | Joe P | 2475 Harvest av |
| 350 | 0013 | Catherine H | 123 Whitecap tr |
| 900 | 0014 | Dayle R | 12 williams dr |
| 1200 | 0015 | Mark M | 150 Paterson av |

START

↓

402 - Simultaneously process row data of key pairs associated with a first row of the second table

↓

404 - Simultaneously process row data of key pairs associated with any remaining rows of the second table in sequential row order

↓

END

Figure 4

TABLE B

| ACCOUNT #(FOREIGN KEY) | ROW # | DEBIT AMT |
|---|---|---|
| 0010 | 1 | 350 |
| 0010 | 2 | 100 |
| 0010 | 3 | 200 |
| 0010 | 4 | 150 |
| 0011 | 1 | 100 |
| 0011 | 2 | 300 |
| 0011 | 3 | 150 |
| 0011 | 4 | 500 |
| 0012 | 1 | 50 |
| 0012 | 2 | 100 |
| 0013 | 1 | 150 |
| 0014 | 1 | 100 |
| 0014 | 2 | 400 |
| 0014 | 3 | 300 |
| 0015 | 1 | 600 |
| 0015 | 2 | 200 |

TABLE A

| BALANCE AMT | ACCOUNT#(PRIMARY KEY) |
|---|---|
| 1200 | 0010 |
| 1500 | 0011 |
| 200 | 0012 |
| 500 | 0013 |
| 1000 | 0014 |
| 1800 | 0015 |

Figure 5A

TABLE B

| ACCOUNT #(FOREIGN KEY) | ROW # | DEBIT AMT |
|---|---|---|
| 0010 | 1 | 350 |
| 0011 | 1 | 100 |
| 0012 | 1 | 50 |
| 0013 | 1 | 150 |
| 0014 | 1 | 100 |
| 0015 | 1 | 600 |

TABLE A

| BALANCE AMT | ACCOUNT#(PRIMARY KEY) |
|---|---|
| 1200 | 0010 |
| 1500 | 0011 |
| 200 | 0012 |
| 500 | 0013 |
| 1000 | 0014 |
| 1800 | 0015 |

Figure 5B

TABLE B

| ACCOUNT #(FOREIGN KEY) | ROW # | DEBIT AMT |
|---|---|---|
| 0010 | 1 | 0 |
| 0011 | 1 | 0 |
| 0012 | 1 | 0 |
| 0013 | 1 | 0 |
| 0014 | 1 | 0 |
| 0015 | 1 | 0 |

TABLE A

| ACCOUNT#(PRIMARY KEY) | BALANCE AMT |
|---|---|
| 0010 | 850 |
| 0011 | 1400 |
| 0012 | 150 |
| 0013 | 350 |
| 0014 | 900 |
| 0015 | 1200 |

Figure 5C

TABLE B

| ACCOUNT #(FOREIGN KEY) | ROW # | DEBIT AMT |
|---|---|---|
| 0010 | 2 | 100 |
| 0011 | 2 | 300 |
| 0012 | 2 | 100 |
| 0014 | 2 | 400 |
| 0015 | 2 | 200 |

TABLE A

| ACCOUNT#(PRIMARY KEY) | BALANCE AMT |
|---|---|
| 0010 | 850 |
| 0011 | 1400 |
| 0012 | 150 |
| 0014 | 900 |
| 0015 | 1200 |

Figure 5D

TABLE B

| ACCOUNT #(FOREIGN KEY) | ROW # | DEBIT AMT |
|---|---|---|
| 0010 | 2 | 0 |
| 0011 | 2 | 0 |
| 0012 | 2 | 0 |
| 0014 | 2 | 0 |
| 0015 | 2 | 0 |

TABLE A

| BALANCE AMT | ACCOUNT#(PRIMARY KEY) |
|---|---|
| 750 | 0010 |
| 1100 | 0011 |
| 50 | 0012 |
| 500 | 0014 |
| 1000 | 0015 |

Figure 5E

TABLE B

| ACCOUNT #(FOREIGN KEY) | ROW # | DEBIT AMT |
|---|---|---|
| 0010 | 3 | 200 |
| 0011 | 3 | 150 |
| 0014 | 3 | 300 |

TABLE A

| ACCOUNT#(PRIMARY KEY) | BALANCE AMT |
|---|---|
| 0010 | 750 |
| 0011 | 1100 |
| 0014 | 500 |

Figure 5F

TABLE B

| ACCOUNT #(FOREIGN KEY) | ROW # | DEBIT AMT |
|---|---|---|
| 0010 | 3 | 0 |
| 0011 | 3 | 0 |
| 0014 | 3 | 0 |

TABLE A

| BALANCE AMT | ACCOUNT#(PRIMARY KEY) |
|---|---|
| 550 | 0010 |
| 950 | 0011 |
| 200 | 0014 |

Figure 5G

TABLE B

| ACCOUNT #(FOREIGN KEY) | ROW # | DEBIT AMT |
|---|---|---|
| 0010 | 4 | 150 |
| 0011 | 4 | 500 |

TABLE A

| ACCOUNT#(PRIMARY KEY) | BALANCE AMT |
|---|---|
| 0010 | 550 |
| 0011 | 950 |

Figure 5H

TABLE B

| ACCOUNT #(FOREIGN KEY) | ROW # | DEBIT AMT |
|---|---|---|
| 0010 | 4 | 0 |
| 0011 | 4 | 0 |

TABLE A

| BALANCE AMT | ACCOUNT#(PRIMARY KEY) |
|---|---|
| 400 | 0010 |
| 450 | 0011 |

Figure 5I

TABLE B

| ACCOUNT #(FOREIGN KEY) | ROW # | DEBIT AMT |
|---|---|---|
| 0010 | 1 | 0 |
| 0010 | 2 | 0 |
| 0010 | 3 | 0 |
| 0010 | 4 | 0 |
| 0011 | 1 | 0 |
| 0011 | 2 | 0 |
| 0011 | 3 | 0 |
| 0011 | 4 | 0 |
| 0012 | 1 | 0 |
| 0012 | 2 | 0 |
| 0013 | 1 | 0 |
| 0014 | 1 | 0 |
| 0014 | 2 | 0 |
| 0014 | 3 | 0 |
| 0015 | 1 | 0 |
| 0015 | 2 | 0 |

C

| BALANCE AMT | ACCOUNT#(PRIMARY KEY) |
|---|---|
| 400 | 0010 |
| 450 | 0011 |
| 50 | 0012 |
| 350 | 0013 |
| 200 | 0014 |
| 1000 | 0015 |

Figure 5J

TABLE B

| ACCOUNT #(FOREIGN KEY) | ROW # | DEBIT AMT |
|---|---|---|
| 0010 | 1 | 350 |

TABLE A

| ACCOUNT#(PRIMARY KEY) | BALANCE AMT |
|---|---|
| 0010 | 1200 |

Figure 6A (Prior Art)

TABLE B

| ACCOUNT #(FOREIGN KEY) | ROW # | DEBIT AMT |
|---|---|---|
| 0010 | 1 | 0 |

TABLE A

| ACCOUNT#(PRIMARY KEY) | BALANCE AMT |
|---|---|
| 0010 | 850 |

Figure 6B (Prior Art)

TABLE B

| ACCOUNT #(FOREIGN KEY) | ROW # | DEBIT AMT |
|---|---|---|
| 0010 | 2 | 100 |

TABLE A

| ACCOUNT#(PRIMARY KEY) | BALANCE AMT |
|---|---|
| 0010 | 850 |

Figure 6C (Prior Art)

TABLE B

| ACCOUNT #(FOREIGN KEY) | ROW # | DEBIT AMT |
|---|---|---|
| 0010 | 2 | 0 |

TABLE A

| ACCOUNT#(PRIMARY KEY) | BALANCE AMT |
|---|---|
| 0010 | 750 |

Figure 6D (Prior Art)

TABLE B

| ACCOUNT #(FOREIGN KEY) | ROW # | DEBIT AMT |
|---|---|---|
| 0010 | 3 | 200 |

TABLE A

| ACCOUNT#(PRIMARY KEY) | BALANCE AMT |
|---|---|
| 0010 | 750 |

Figure 6E
(Prior Art)

TABLE B

| ACCOUNT #(FOREIGN KEY) | ROW # | DEBIT AMT |
|---|---|---|
| 0010 | 3 | 0 |

TABLE A

| ACCOUNT#(PRIMARY KEY) | BALANCE AMT |
|---|---|
| 0010 | 550 |

Figure 6F (Prior Art)

TABLE B

| ACCOUNT #(FOREIGN KEY) | ROW # | DEBIT AMT |
|---|---|---|
| 0010 | 4 | 150 |

TABLE A

| ACCOUNT#(PRIMARY KEY) | BALANCE AMT |
|---|---|
| 0010 | 550 |

Figure 6G (Prior Art)

TABLE B

| ACCOUNT #(FOREIGN KEY) | ROW # | DEBIT AMT |
|---|---|---|
| 0010 | 4 | 0 |

TABLE A

| ACCOUNT#(PRIMARY KEY) | BALANCE AMT |
|---|---|
| 0010 | 400 |

Figure 6H (Prior Art)

TABLE B

| ACCOUNT #(FOREIGN KEY) | ROW # | DEBIT AMT |
|---|---|---|
| 0011 | 1 | 100 |

TABLE A

| ACCOUNT#(PRIMARY KEY) | BALANCE AMT |
|---|---|
| 0011 | 1500 |

Figure 6I (Prior Art)

TABLE B

| ACCOUNT #(FOREIGN KEY) | ROW # | DEBIT AMT |
|---|---|---|
| 0011 | 1 | 0 |

TABLE A

| ACCOUNT#(PRIMARY KEY) | BALANCE AMT |
|---|---|
| 0011 | 1400 |

Figure 6J (Prior Art)

TABLE B

| ACCOUNT #(FOREIGN KEY) | ROW # | DEBIT AMT |
|---|---|---|
| 0011 | 2 | 300 |

TABLE A

| ACCOUNT#(PRIMARY KEY) | BALANCE AMT |
|---|---|
| 0011 | 1400 |

Figure 6K (Prior Art)

TABLE B

| ACCOUNT #(FOREIGN KEY) | ROW # | DEBIT AMT |
|---|---|---|
| 0011 | 2 | 0 |

TABLE A

| ACCOUNT#(PRIMARY KEY) | BALANCE AMT |
|---|---|
| 0011 | 1100 |

Figure 6L (Prior Art)

TABLE B

| ACCOUNT #(FOREIGN KEY) | ROW # | DEBIT AMT |
|---|---|---|
| 0011 | 3 | 150 |

TABLE A

| ACCOUNT#(PRIMARY KEY) | BALANCE AMT |
|---|---|
| 0011 | 1100 |

Figure 6M (Prior Art)

TABLE B

| ACCOUNT #(FOREIGN KEY) | ROW # | DEBIT AMT |
|---|---|---|
| 0011 | 3 | 0 |

TABLE A

| ACCOUNT#(PRIMARY KEY) | BALANCE AMT |
|---|---|
| 0011 | 950 |

Figure 6N (Prior Art)

TABLE B

| ACCOUNT #(FOREIGN KEY) | ROW # | DEBIT AMT |
|---|---|---|
| 0011 | 4 | 500 |

TABLE A

| ACCOUNT#(PRIMARY KEY) | BALANCE AMT |
|---|---|
| 0011 | 950 |

Figure 60

(Prior Art)

TABLE B

| ACCOUNT #(FOREIGN KEY) | ROW # | DEBIT AMT |
|---|---|---|
| 0011 | 4 | 0 |

TABLE A

| ACCOUNT#(PRIMARY KEY) | BALANCE AMT |
|---|---|
| 0011 | 450 |

Figure 6P (Prior Art)

TABLE B

| ACCOUNT #(FOREIGN KEY) | ROW # | DEBIT AMT |
|---|---|---|
| 0010 | 1 | 350 |
| 0011 | 1 | 100 |
| 0012 | 1 | 50 |
| 0013 | 1 | 150 |
| 0014 | 1 | 100 |
| 0015 | 1 | 600 |

TABLE A

| ACCOUNT#(PRIMARY KEY) | BALANCE AMT |
|---|---|
| 0010 | 1200 |
| 0011 | 1500 |
| 0012 | 200 |
| 0013 | 500 |
| 0014 | 1000 |
| 0015 | 1800 |

Figure 7A

TABLE B

| ACCOUNT #(FOREIGN KEY) | ROW # | DEBIT AMT |
|---|---|---|
| 0010 | 1 | 0 |
| 0011 | 1 | 0 |
| 0012 | 1 | 0 |
| 0013 | 1 | 0 |
| 0014 | 1 | 0 |
| 0015 | 1 | 0 |

TABLE A

| ACCOUNT#(PRIMARY KEY) | BALANCE AMT |
|---|---|
| 0010 | 850 |
| 0011 | 1400 |
| 0012 | 150 |
| 0013 | 350 |
| 0014 | 900 |
| 0015 | 1200 |

Figure 7B

PROCESSOR CONFIGURED TO PROCESS DATA IN A DATABASE BY SIMULTANEOUSLY PROCESSING ROW DATA OF KEY PAIRS WHICH INCLUDE A KEY OF A FIRST TABLE IN THE DATABASE, AND A MATCHING KEY AND A UNIQUE ROW OF A SECOND TABLE IN THE DATABASE

CROSS-REFERENCE TO RELATED APPLICATIONS

This application is a continuation of copending U.S. Non-Provisional patent application Ser. No. 18/117,187 filed Mar. 3, 2023, now U.S. Pat. No. 12,072,873, which, in turn, is a continuation of U.S. Non-Provisional patent application Ser. No. 17/391,367 filed Aug. 2, 2021, now U.S. Pat. No. 11,599,529, both of which are incorporated by reference herein.

This application is related to U.S. application Ser. No. 17/391,401 filed Aug. 2, 2021 entitled "Method of processing data in a database by simultaneously processing row data of key pairs which include a key of a first table in the database, and a matching key and a unique row of a second table in the database, now U.S. Pat. No. 11,599,530."

BACKGROUND OF THE INVENTION

Batch processing is the processing of transactions in a group or batch. While batch processing can be carried out at any time, it is ideally suited to end-of-cycle processing, such as for updating bank accounts at the end of a day. However, as the size of databases continue to grow, the time and computer resources required to perform batch processing on tables of the databases have reached an unacceptable level for efficient operation of the businesses that rely on the databases. Accordingly, there is a need for processes that can dramatically reduce the time and computer resources to perform batch processing. The present invention fulfills such a need.

BRIEF SUMMARY OF THE INVENTION

One preferred embodiment of the present invention, also referred to herein as "Detached Field Batch Process" (DFBP), addresses the following problem and provides the following solution.

Problem: All programs currently available that are designed to process batch transactions employ a method that was developed many decades ago. A major deficiency of this method is that the entire record set with all of its data is moved during the batch process. In principle, this can contribute significantly to a decrease in performance due to the increased I/O needed for both moving and sorting the records as the entire record must be kept with all of its data throughout the process. It is very common with large datasets that a significant portion of the record has a lot of irrelevant data, namely, data that is not needed within the business logic of the batch process.

Solution: The detached field batch process (DFBP) makes use of modern technology to detach the fields in the batch record that are only relevant for the process to be successful from the fields that are not relevant, or unnecessary, and then reattach the fields within the record after each step of the process.

By definition, the relevant fields are the key fields that are used for matching records and any field that is being used by the business logic during the batch process. By removing the unnecessary fields, the DFBP method significantly improves the performance of the process by reducing the costly resources needed such as memory and disk, commonly employed when processing large datasets. Not only does the method remove resource costs, a reduction in processing time is also achieved given the smaller subset of data being processed.

The fact that the batch program doesn't need to know the full content or the full record layout of the records being processed contributes to the development of a modular program structure that is reusable for any batch process.

The DFBP can be fully restarted at any point if the program fails, whereas the current batch processing methods require the cleanup of the files used in order to ensure data integrity. The DFBP saves time and effort of performing a cleanup since the DFBP process automatically selects the key fields of the records that are not processed during the previous run.

In summary, The DFBP method for processing batch transactions provides unique benefits that are not currently available with traditional batch processing. Removing the unnecessary fields of a record during the majority of the batch process improves the utilization of the CPU, memory and disk space, increases transaction processing speed, and positively contributes to data integrity and a modular program structure.

Another preferred embodiment of the present invention, also referred to herein as "Horizontal Processing of Sequential Data" (HPSD), which is also applicable to non-sequential data, addresses the following problem and provides the following solution.

Problem: Sequential data is defined as information that is stored in sequential order, where the beginning of each subsequent row of data follows the end of the preceding row of data. A current method of processing sequential data reads each row sequentially, or vertically, from the top to the bottom of the file, only processing one row of data at a time. The effect of this is that the processing of all the rows of data can take several hours when performed on large datasets, even on the most powerful computers.

In addition, for these datasets to be processed sequentially, all of the input files need to be sorted prior to the sequential process, as they require a given set of unique keys based on a given set of business rules that define the logic in the process. The sort process is frequently much longer than the core business logic in the sequential process. The sort also consumes a lot of resources like compute, disk space, i/o operations, and memory which can add materially to the overall cost.

Solution: The challenges and limitations described above can be addressed by processing one row of data, horizontally, instead of vertically from top to bottom. This is accomplished by processing every record with the same key set/combination, simultaneously. Instead of reading each row sequentially (i.e., row by row, from top to bottom), a set of rows associated with every key set can be read simultaneously, and this process can be repeated until all rows for all key/set combinations are processed. Although the data is stacked up vertically, it is viewed and processed as horizontal layers.

This method of horizontal processing of sequential data (HPSD) has become possible with modern methods of data storage and the speed improvements offered by Massively Parallel Processing (MPP) architectures. These advancements allow the HPSD method to process data within a fraction of time compared with conventional batch processes on sequential data. Additionally, the HPSD method completely eliminates the need for independent sorting before the process.

The HPSD method can process rows of data over 20 times faster than current mainframe capabilities and 160 times faster than the highest performing Relational Database Management Systems (RDMS). By way of cost comparison, the same workload implementing HPSD is about ⅓th of 1% of the cost of resources on the mainframe performing the conventional sequential method.

The HPSD method does not require any procedural language for implementation. In achieving significant performance gains over the conventional methods, the HPSD takes advantage of the available CPU capacity of the system to process millions or billions of rows of data simultaneously as there is no information transfer required from one key to another key while processing all of the data. This allows the HPSD method to process multiple datasets/files much more efficiently than conventional methods.

As noted above, and described and illustrated further below, the HPSD method is equally applicable to non-sequential data. Accordingly, the HPSD method is more generically referred to below as the Horizontal Processing of Data (HPD) method.

BRIEF DESCRIPTION OF THE DRAWINGS

Preferred embodiments of the present invention will now be described by way of example with reference to the accompanying drawings:

FIG. 1 is a flowchart of the DFBP method in accordance with one preferred embodiment of the present invention.

FIGS. 2A-2C show sample tables for use with the DFBP method in accordance with one preferred embodiment of the present invention.

FIG. 4 is a flowchart of the HPD method in accordance with one preferred embodiment of the present invention.

FIGS. 5A-5J show sample tables for use with the HPD method in accordance with one preferred embodiment of the present invention.

FIGS. 6A-6P partially illustrate how the same set of data in FIGS. 5A-5J would be processed using a conventional (prior art) method.

FIGS. 7A-7B show sample tables for use with the HPD method applied to non-sequential data.

DETAILED DESCRIPTION OF THE INVENTION

Figure 3:
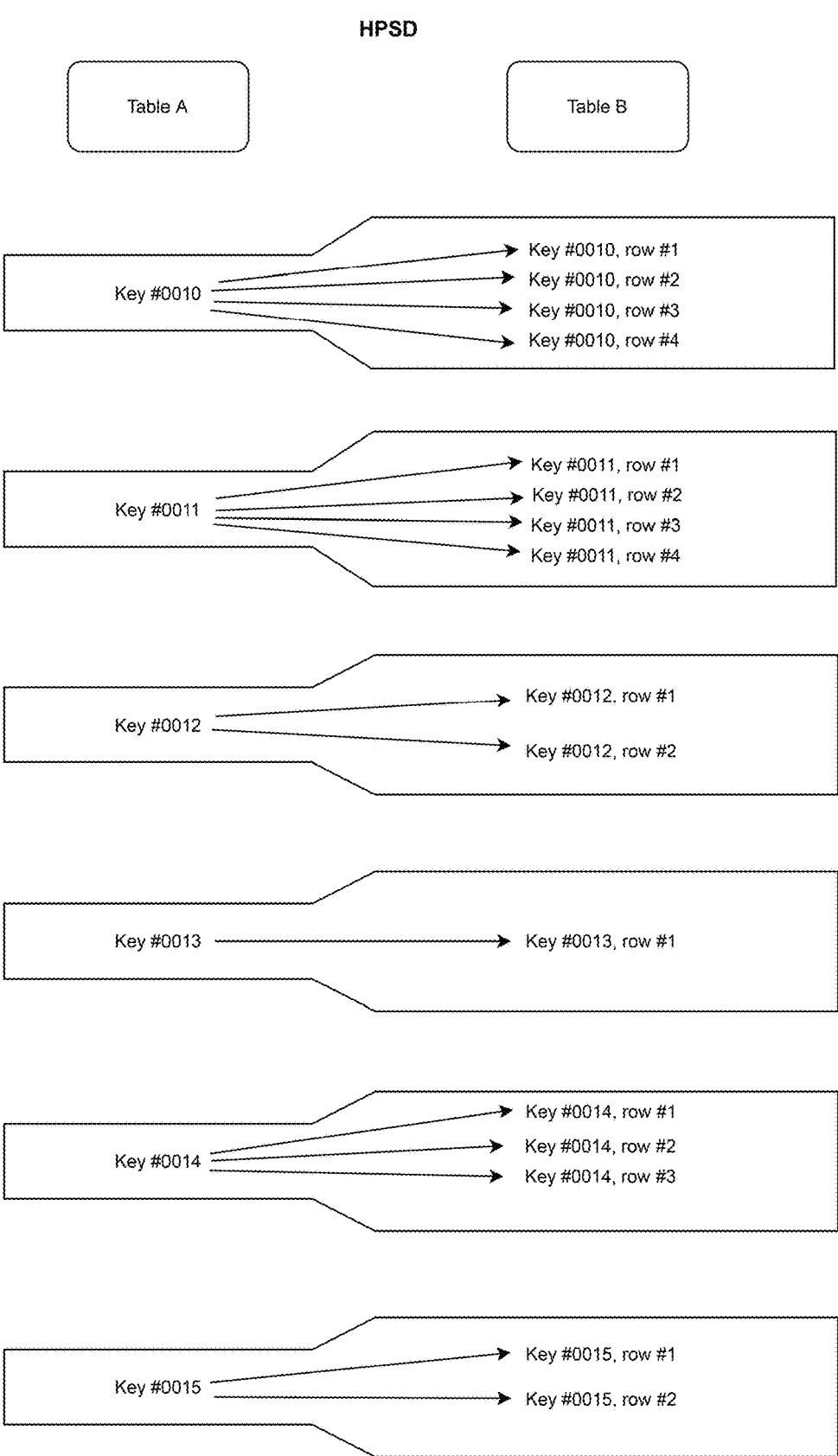
FIG. 3 is a diagram that illustrates matching key pairs for the HPD method.

Certain terminology is used herein for convenience only and is not to be taken as a limitation on the present invention. The words "a" and "an", as used in the claims and in the corresponding portions of the specification, mean "at least one."

I. DFBP Method

FIG. 1 is a flowchart 100 of one preferred embodiment of the DFBP method. More specifically, the DFBP method is a method of batch processing data that is stored in multiple tables and is organized in the tables as a plurality of rows of data and a plurality of columns. Each row is identified by a key, and each column represents a field having a unique field name.

The batch processing is performed using batch processing logic. In operation, the batch processing operates as follows:

Step 102: Read out data from only a portion of a row from each of the tables that is to be used for the batch processing logic by specifying (i) the key of the row from the respective table, and (ii) the unique field names in the row of the respective table to be used for the batch processing logic. The remaining portion of the data in the row of the respective table is not read out from the row.

Step 104: Perform batch processing on the read out data using the batch processing logic.

Step 106: Write back the batch processed data from Step 104 into the same row of the respective table that the data was read out from in Step 102, wherein the resultant row of each of the tables includes (i) batch processed data, and (ii) the remaining portion of the data in the row in each of the tables that was not read out from the row in Step 102.

The batch processing inherently acts on data in multiple, detached tables. Accordingly, the row data exists in the multiple, detached tables.

In one preferred embodiment, the data is initially structured as a flat file having sequential data. When performing the DFBP method, the data in the one or more flat files is imported into the multiple tables before the batch processing is performed. The scope of the present invention is equally applicable to data that is initially stored in other file formats, such as Virtual Storage Access Method (VSAM), wherein the data is likewise imported into tables for processing in accordance with the DFBP method.

This process is in contrast to the prior art wherein all fields that will be needed in the output are read out from the tables, even if only some fields need to be manipulated (i.e., used for the batch processing logic). In prior art batch processing methods, a new file is created for the output of the process. Accordingly, if any fields are not read out, they will not appear in the output file which would result in an incomplete output file. The method of the present invention reuses the existing file by writing back the batch processed data.

Consider a simplified example wherein there are 20 fields in a record (row). ("Record" and "row" are used interchangeably herein.) The output needs 10 fields, and 5 of those fields are needed for the batch processing logic, and 2 of the 5 fields will be updated. The other 3 fields that are needed for the batch processing logic will not have their values updated. In the DFBP method, one reads out only the 5 fields that are needed for the batch processing logic. After the batch processing logic is completed, all 5 of the initially read out fields are read back in, which includes the 2 fields that were updated and the 3 fields that were not updated.

In the prior art, all 10 fields will be read out since the prior art will be create a new file for the output, and thus needs to read out the 5 fields that are not used in the batch processing logic and which will not otherwise be updated.

In practice, many records have very large amounts of fields, all or most of which must be retained for the output of the process, but the batch processing logic only needs to act on a few of the fields. In this type of scenario, the benefits of the DFBP method are significant compared to prior art methods.

FIGS. 2A-2C show sample tables for use with the DFBP method. (In the tables, "DB AMT" refers to "DEBIT AMOUNT.") FIG. 2A shows the initial state of the tables. In this simplified example, Table A contains only one row per key, whereas Table B contains multiple rows per key. Accordingly, in this simplified example, only the data in row #1 of Table B is illustrated as being processed. FIG. 2B shows only the fields that are necessary for the batch processing logic, namely, the balance amount of Table A and the debit amount of Table B. The name and address fields in Table A and the Date and TranID are not used in the batch processing logic, and thus are not read out. FIG. 2C shows the state of the tables after completion of processing of the row #1 data in Table B. The balance amounts in Table A and the Debit Amounts in Table B are modified. The unused columns are attached back. The row numbers and the keys are used, but are not modified.

The example of FIGS. 2A-2C show only two tables. However, there may be any number of tables involved in the batch processing performed in accordance with the DFBP method, and the scope of the present invention is not limited to processing data of only two tables.

II. HPSD Method

The HPD method is a method of processing data in a database, wherein the database includes a first table and a second table. Each of the tables have a plurality of rows of data, and a key identifies one or more rows of data in the tables. There is a plurality of matching key pairs among the tables. Each key pair includes a key of a first table, and a matching key and a unique row of a second table.

FIG. 3 is a diagram that illustrates matching key pairs for two tables, namely, Table A and Table B. For example, FIG. 3 shows the following matching key pairs identified in Table 1:

TABLE 1

| Table A | Table B |
|---------|---------|
| Key #0010 | Key #0010, rows #1-4 |
| Key #0011 | Key #0011, rows #1-4 |
| Key #0012 | Key #0012, rows #1-2 |
| Key #0013 | Key #0013, row #1 |
| Key #0014 | Key #0014, rows #1-4 |
| Key #0015 | Key #0015, rows #1-2 |

The "key of the first table" represents a unique row of the first table. Each key has one or more key pairs. For example, Key #0010 of Table A has four key pairs (Key #0010, rows #1-4), whereas Key #0013 of Table A has one key pair (Key #0013, row #1).

Referring to FIG. 4, in operation, the data is processed as follows:

STEP 402: Simultaneously process row data of key pairs associated with a first row of the second table. That is, row data of both tables are processed, but only the row data of the key pairs associated with the first row of the second table is processed. Stated another way, with respect to FIG. 3 and Table 1, this step involves simultaneously reading out and processing all rows (records) that have the same key pair.

STEP 404: Simultaneously process row data of key pairs associated with any remaining rows of the second table in sequential row order.

The processing of the row data may include reading, updates, and inserts. The data in the database may be organized as sequential data or as non-sequential data. In one preferred embodiment, the keys of the first table are primary keys, and the keys of the second table are foreign keys.

The tables used for the HPD method also have columns, similar to the tables used for the DFBP method.

FIGS. 5A-5J show sample tables for use with the HPD method. For illustration purposes, the tables show the same data and fields as the tables used to illustrate the DFBP method.

FIG. 5A shows the initial tables.

FIG. 5B: First layer of data before processing (Step 1). (6 matching key pairs)

FIG. 5C: First layer of data after processing (Step 1).

FIG. 5D: 2nd layer of data before processing (Step 2). (5 matching key pairs)

FIG. 5E: 2nd layer of data after processing (Step 2).

FIG. 5F: 3rd layer of data before processing (Step 3). (3 matching key pairs)

FIG. 5G: 3rd layer of data after processing (Step 3).

FIG. 5H: 4th layer of data before processing (Step 4). (2 matching key pairs)

FIG. 5I: 4th layer of data after processing (Step 4) (Processing is completed)

FIG. 5C: Fully processed tables.

FIGS. 6A-6P partially illustrate how the same set of data would be processed using a conventional (prior art) method wherein only one key at a time is processed.

FIG. 6A: Before processing (Step 1).

FIG. 6B: After processing (Step 1).

FIG. 6C: Before processing (Step 2).

FIG. 6D: After processing (Step 2).

FIG. 6E: Before processing (Step 3).

FIG. 6F: After processing (Step 3).

FIG. 6G: Before processing (Step 4).

FIG. 6H: After processing (Step 4).

FIG. 6I: Before processing (Step 5).

FIG. 6J: After processing (Step 5).

FIG. 6K: Before processing (Step 6).

FIG. 6L: After processing (Step 6).

FIG. 6M: Before processing (Step 7).

FIG. 6N: After processing (Step 7).

FIG. 6O: Before processing (Step 8).

FIG. 6P: After processing (Step 8).

The process is not even complete after twice as many steps (4 vs 8) because Step 8 is still only processing the second key (0011) and there are still four more keys to process (0012-0115). The remaining steps are not illustrated. In sum, the conventional processing requires considerably more steps, which means more time and computer resources is required than the HPD method. Furthermore, this is a simplified example with small tables. In practice, most table sizes are significantly larger, and thus the reduction in steps using the HPD method is even more dramatic than the present example.

FIGS. 7A-7B show an example of the HPD method applied to non-sequential data. In this example, the data is considered to be non-sequential because there is only one row.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A processor configured to process data in a database, wherein the database includes a first table and a second table, each of the tables having a plurality of rows of data, wherein a key identifies one or more rows of data in the tables, and wherein there is a plurality of matching key pairs among the tables, each key pair including (i) a key of a first table, and (ii) a matching key and a unique row of a second table, wherein the processor is configured to:

(a) simultaneously process row data of key pairs associated with a first row of the second table of the database; and (b) simultaneously process row data of key pairs associated with any remaining rows of the second table of the database in sequential row order.

2. The processor of claim 1 wherein the processing of the row data includes reading, updates, inserts.

3. The processor of claim 1 wherein the data in the database is organized as sequential data.

4. The processor of claim 1 wherein the data in the database is organized as non-sequential data.

5. The processor of claim 1 wherein the keys of the first table are primary keys, and the keys of the second table are foreign keys.

\* \* \* \* \*